(12) United States Patent
Katayose

(10) Patent No.: US 12,411,324 B2
(45) Date of Patent: Sep. 9, 2025

(54) ZOOM LENS AND IMAGING APPARATUS INCLUDING THE SAME

(71) Applicant: CANON KABUSHIKI KAISHA, Tokyo (JP)

(72) Inventor: Masato Katayose, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 17/852,195

(22) Filed: Jun. 28, 2022

(65) Prior Publication Data

US 2022/0413270 A1    Dec. 29, 2022

(30) Foreign Application Priority Data

Jun. 29, 2021 (JP) .................. 2021-108063

(51) Int. Cl.
*G02B 15/14*    (2006.01)
*G03B 5/02*    (2021.01)

(52) U.S. Cl.
CPC .......... *G02B 15/145523* (2019.08); *G02B 15/143507* (2019.08); *G02B 15/144515* (2019.08); *G03B 5/02* (2013.01)

(58) Field of Classification Search
CPC .... G02B 15/143505; G02B 15/143507; G02B 15/144511; G02B 15/144513; G02B 15/144515; G02B 15/145523; G02B 15/1465; G02B 15/145517; G02B 15/145519; G02B 15/145521; G02B 15/145525; G02B 15/145527; G02B 15/145529; G02B 15/145531; G02B 9/64; G02B 13/02; G03B 5/02

USPC ............................................. 359/676
See application file for complete search history.

(56) References Cited

U.S. PATENT DOCUMENTS

| 9,958,656 | B2* | 5/2018 | Kawamura | G02B 15/1425 |
| 2013/0250160 | A1* | 9/2013 | Neil | G02B 15/14 359/686 |
| 2013/0286257 | A1* | 10/2013 | Tashiro | G02B 9/60 359/557 |
| 2019/0302431 | A1* | 10/2019 | Kawamura | G02B 15/177 |

(Continued)

FOREIGN PATENT DOCUMENTS

| JP | 2010176096 A | 8/2010 |
| JP | 2013156477 A | 8/2013 |

(Continued)

*Primary Examiner* — Zachary W Wilkes
*Assistant Examiner* — Elizabeth M Hall
(74) *Attorney, Agent, or Firm* — Canon U.S.A., Inc. IP Division

(57) ABSTRACT

A zoom lens L0 consists of a first lens unit L1 having negative refractive power, a middle group Lm including one or more lens units, and a last lens unit having positive refractive power. The first lens unit L1 includes a first negative lens, a second negative lens, and a third negative lens that are arranged sequentially in an order from an object side to an image side. The number of negative lenses included in the first lens unit L1 is four or less. The middle group Lm includes a plurality of cemented lenses each having a cemented surface that is convex toward the object side, and includes a lens element Ln that is disposed closest to the image side among lens elements having negative refractive power included in the middle group Lm. The zoom lens L0 satisfies a predetermined inequality.

17 Claims, 9 Drawing Sheets

(56) References Cited

U.S. PATENT DOCUMENTS

| | | | |
|---|---|---|---|
| 2021/0149168 A1* | 5/2021 | Uehara | .................... G03B 5/00 |
| 2022/0269056 A1* | 8/2022 | Yamashita | ..... G02B 15/144511 |

FOREIGN PATENT DOCUMENTS

| | | | |
|---|---|---|---|
| JP | 2015094884 A | | 5/2015 |
| JP | 2017122743 A | | 7/2017 |
| JP | 2017129825 A | | 7/2017 |
| JP | 2019066653 A | | 4/2019 |
| JP | 2019066654 A | | 4/2019 |
| JP | 2020030251 A | | 2/2020 |

* cited by examiner

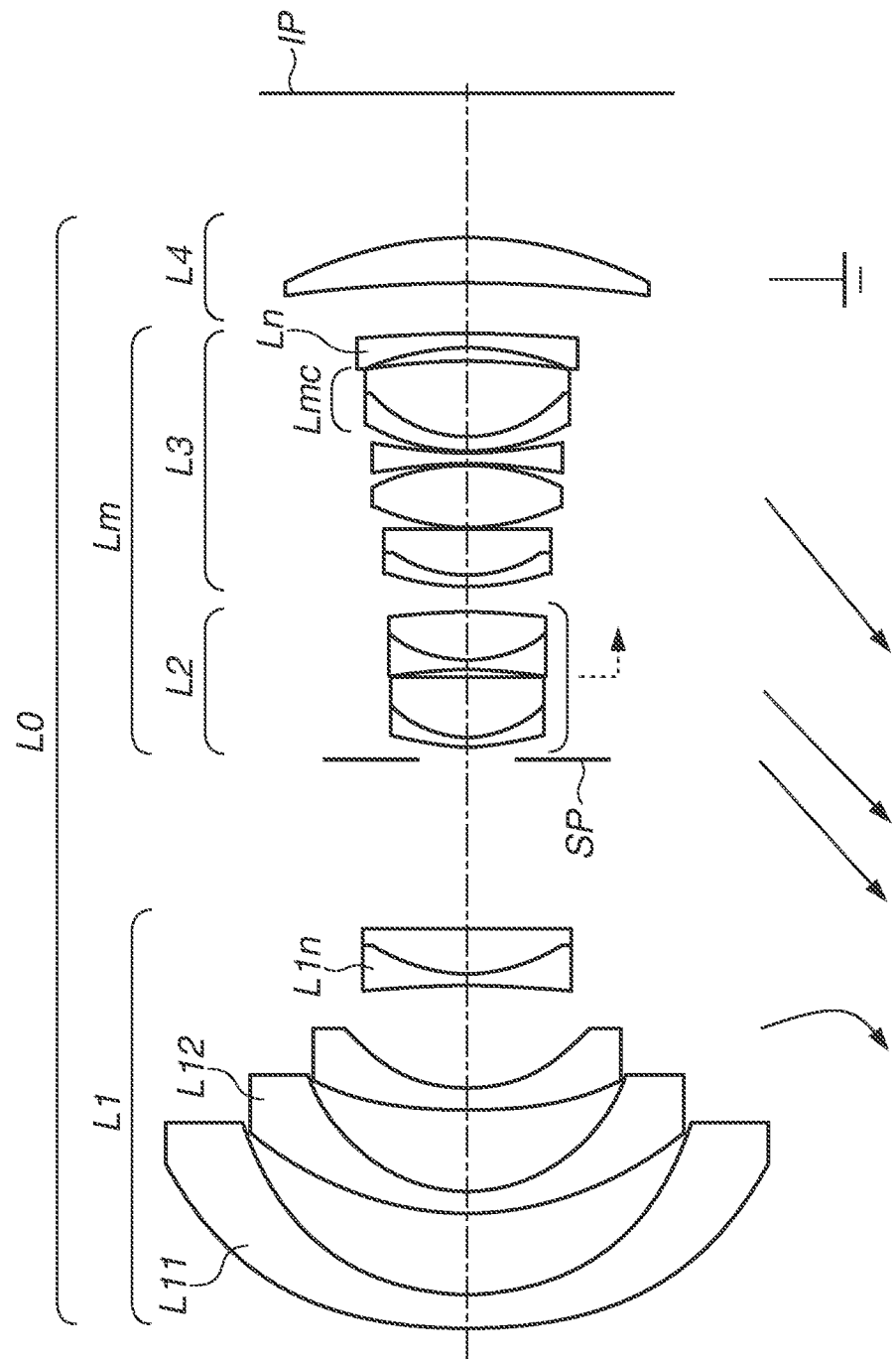

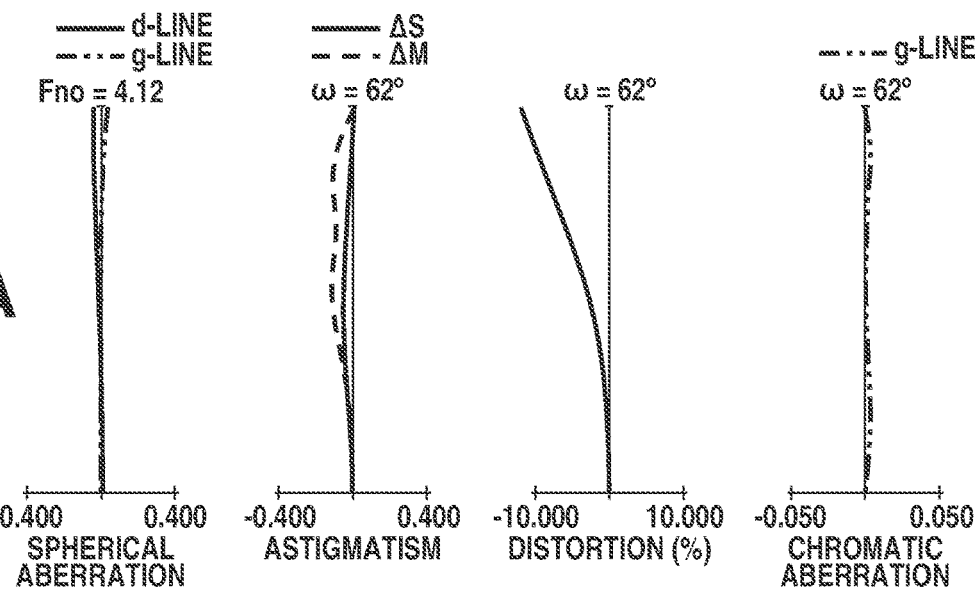
FIG.2A
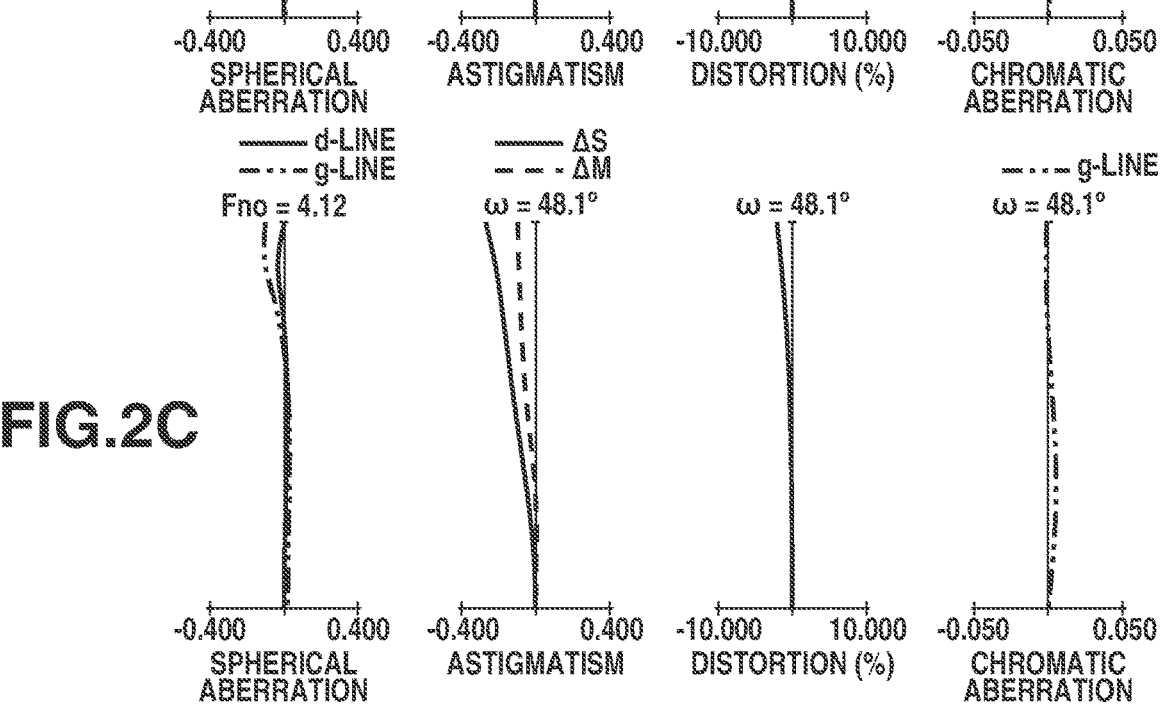
FIG.2B
FIG.2C

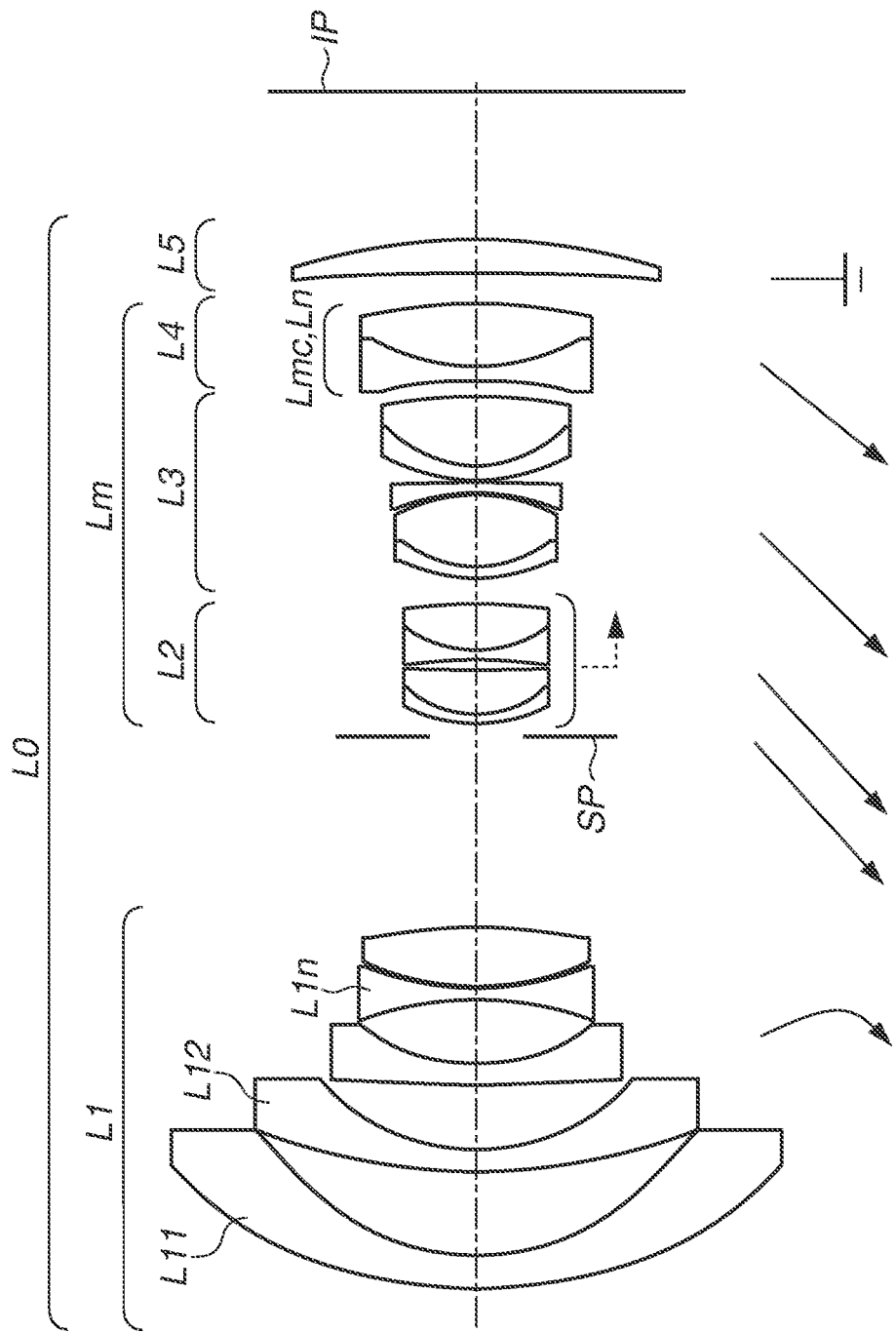

ZOOM LENS AND IMAGING APPARATUS INCLUDING THE SAME

BACKGROUND

Technical Field

The aspect of the embodiments relates to a zoom lens and an imaging apparatus including the zoom lens, such as a digital video camera, a digital still camera, a broadcast camera, or a silver-halide film camera.

Description of the Related Art

A negative lead type zoom lens is known as a zoom lens that has a compact entire lens system and easily achieves a wide angle. In the negative lead type zoom lens, a lens unit having negative refractive power is disposed closest to the object side.

Japanese Patent Application Laid-Open No. 2010-176096 discusses a negative lead type zoom lens including five lens units.

A negative lead type zoom lens has an asymmetric lens configuration, and thus has an issue of difficulty in correcting aberrations. For example, to achieve a wide angle of view with a negative lead type zoom lens, the refractive power of a first lens unit having negative refractive power is to be increased. However, in this case, aberrations such as magnification chromatic aberrations in a wide-angle range are likely to occur significantly.

To provide a negative lead type zoom lens that ensures high optical performance while achieving a compact optical system and a wide angle of view, lens units that are arranged closer to an image side than an aperture stop are need to be configured appropriately in order to correct the aberrations that can occur at the first lens unit having strong refractive power. However, the zoom lens discussed in Japanese Patent Application Laid-Open No. 2010-176096 is not sufficient in this point.

SUMMARY

According to an aspect of the embodiments, a zoom lens consists of a first lens unit having negative refractive power, a middle group including one or more lens units, and a last lens unit having positive refractive power that are arranged in an order from an object side to an image side. A spacing between adjacent lens units, among the lens units, changes in zooming. The zoom lens includes an aperture stop. The first lens unit includes a first negative lens, a second negative lens, and a third negative lens that are arranged in the order from the object side to the image side. A number of the negative lenses included in the first lens unit is four or less. The middle group includes a plurality of cemented lenses each having a cemented surface that is convex toward the object side, and includes a lens element Ln that is disposed closest to the image side among lens elements having negative refractive power included in the middle group. The following inequalities are satisfied:

$1.2 < |f1|/fw < 2.0$, $0.5 < L1s/Lsn < 1.8$, and $0.7 < |fn|/Lsn < 2.0$, where f1 is a focal length of the first lens unit, fw is a focal length of the zoom lens at a wide angle end, L1s is a distance on an optical axis from a lens surface, of the zoom lens, disposed closest to the object side to the aperture stop at the wide angle end, Lsn is a distance on the optical axis from the aperture stop to a lens surface, of the lens element Ln, disposed closest to the image side at the wide angle end, and fn is a focal length of the lens element Ln.

Further features of the disclosure will become apparent from the following description of exemplary embodiments with reference to the attached drawings.

BRIEF DESCRIPTION OF THE DRAWINGS

FIG. 1 is a cross-sectional view illustrating lenses of a zoom lens at a wide angle end according to a first exemplary embodiment.

FIGS. 2A to 2C are aberration charts of the zoom lens according to the first exemplary embodiment.

FIG. 3 is a cross-sectional view illustrating lenses of a zoom lens at a wide angle end according to a second exemplary embodiment.

DESCRIPTION OF THE EMBODIMENTS

Figure 4A:
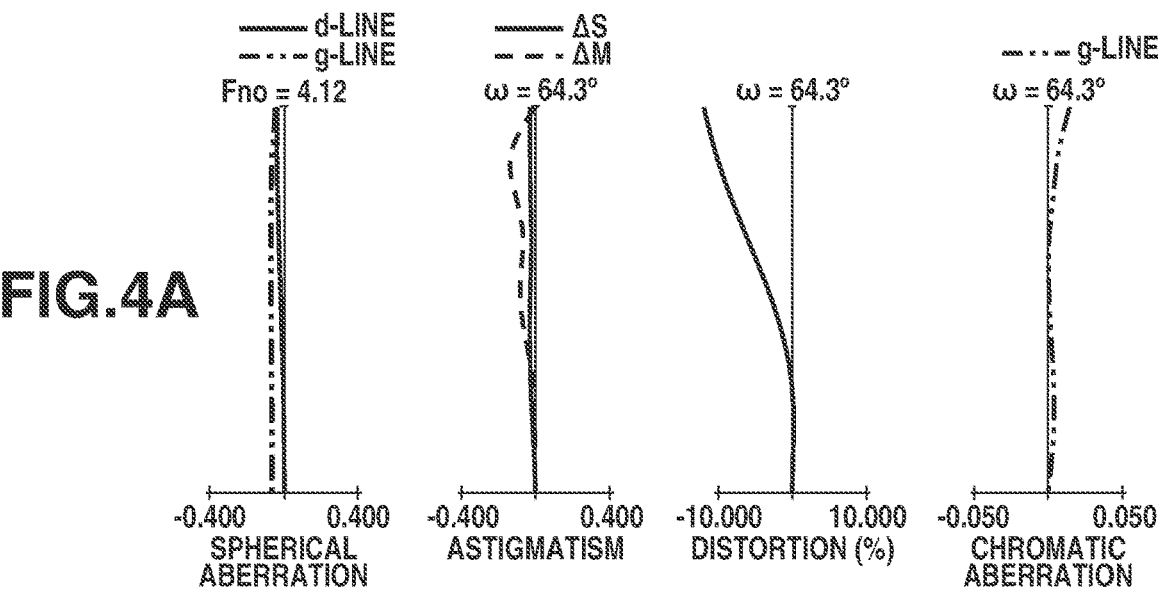
FIGS. 4A to 4C are aberration charts of the zoom lens according to the second exemplary embodiment.
Figure 4B:
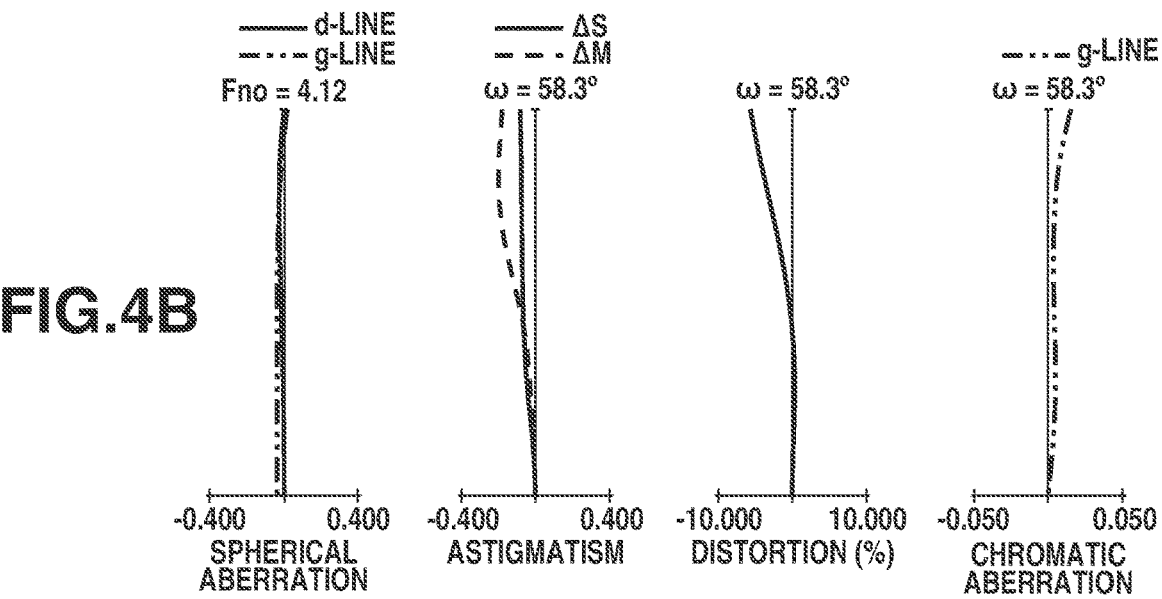
Figure 4C:
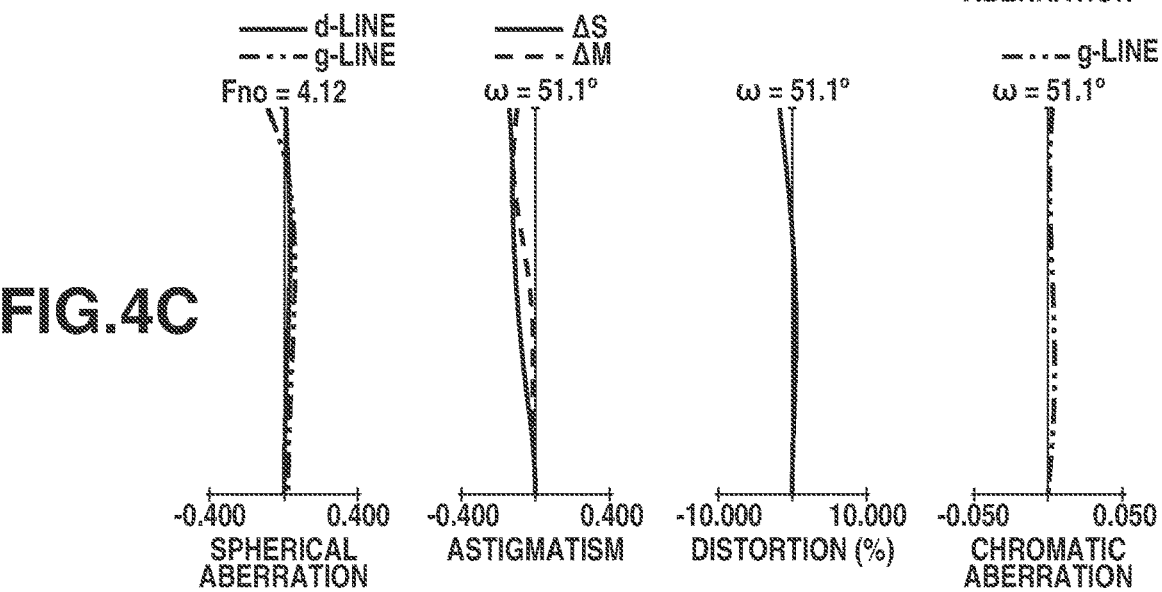
Figure 5:
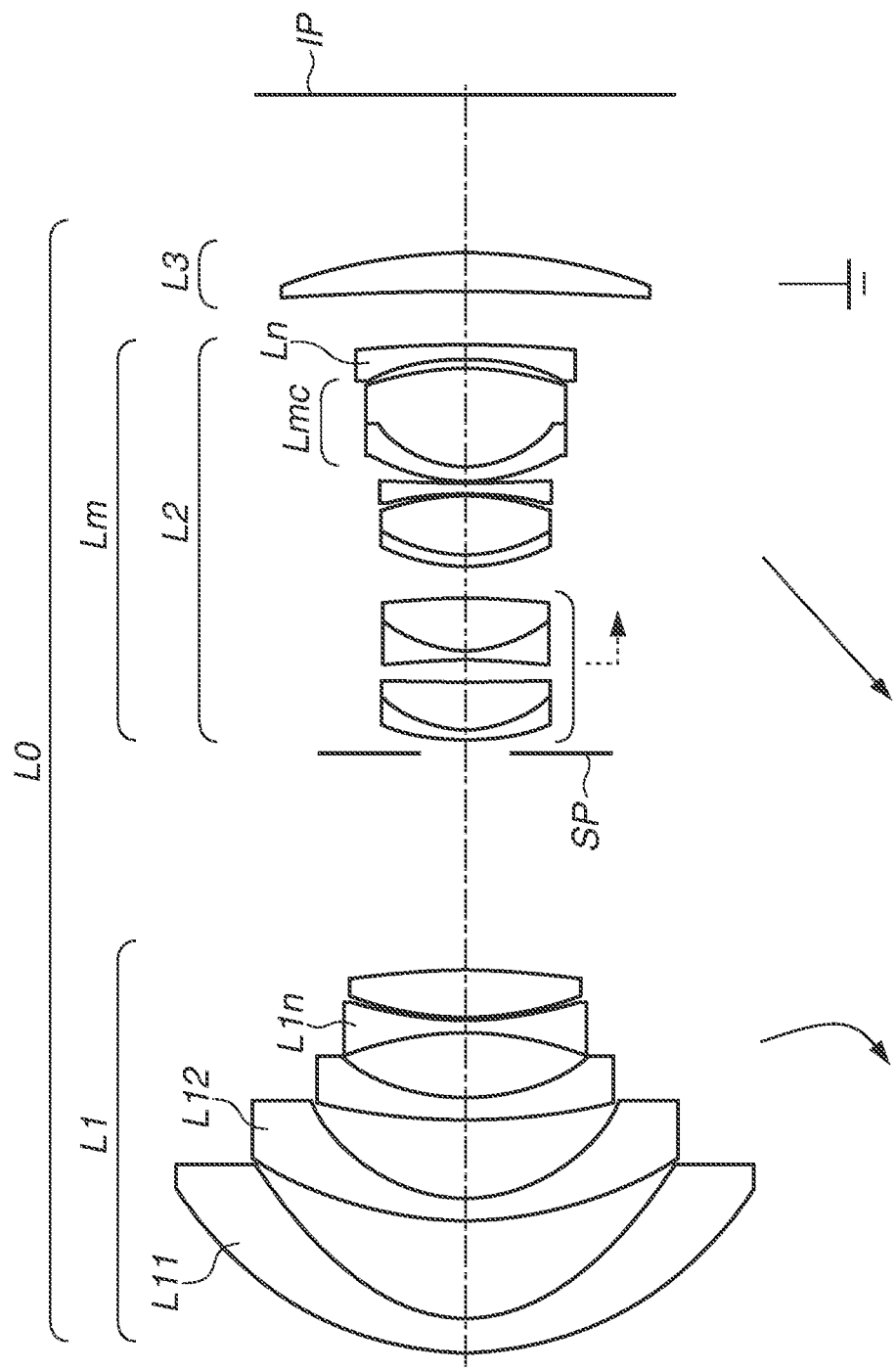
FIG. 5 is a cross-sectional view illustrating lenses of a zoom lens at a wide angle end according to a third exemplary embodiment.
Figure 6A:
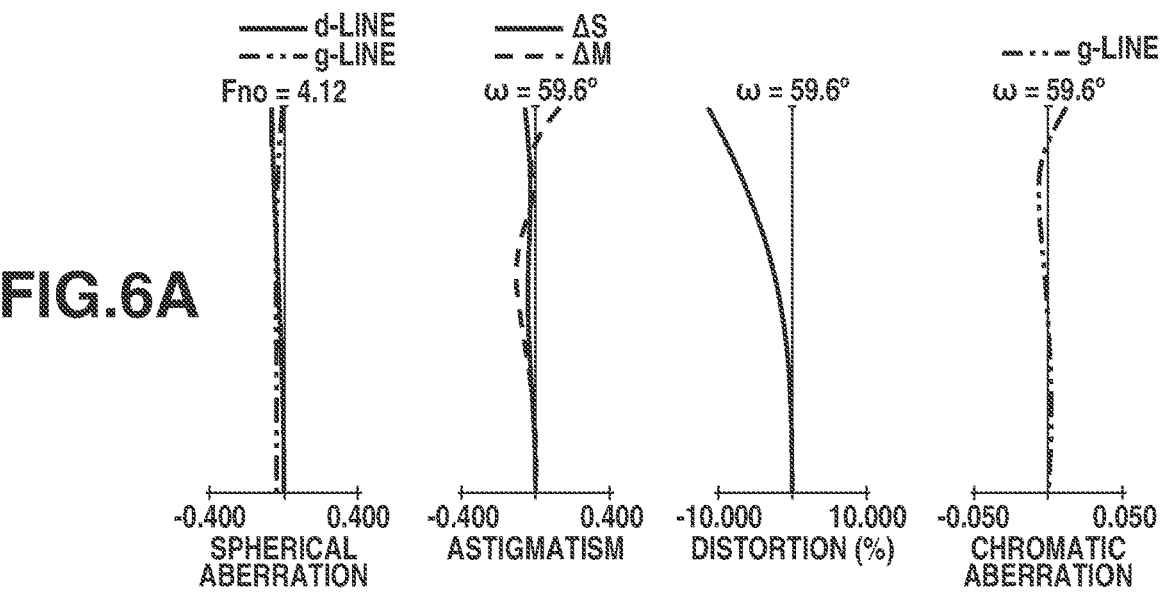
FIGS. 6A to 6C are aberration charts of the zoom lens according to the third exemplary embodiment.
Figure 6B:
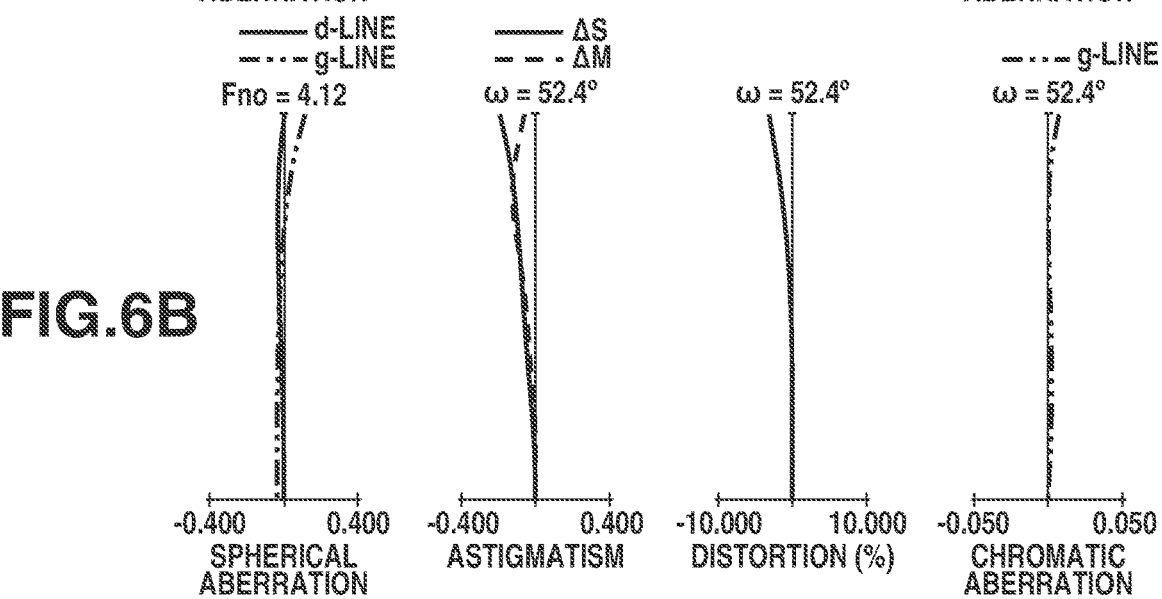
Figure 6C:
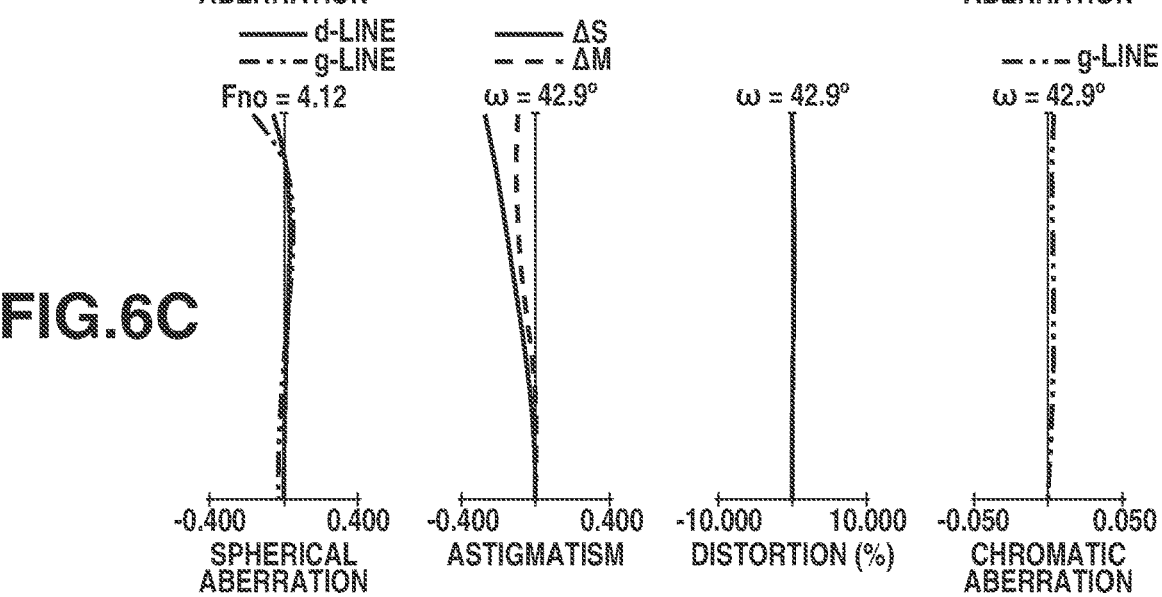
Figure 7:
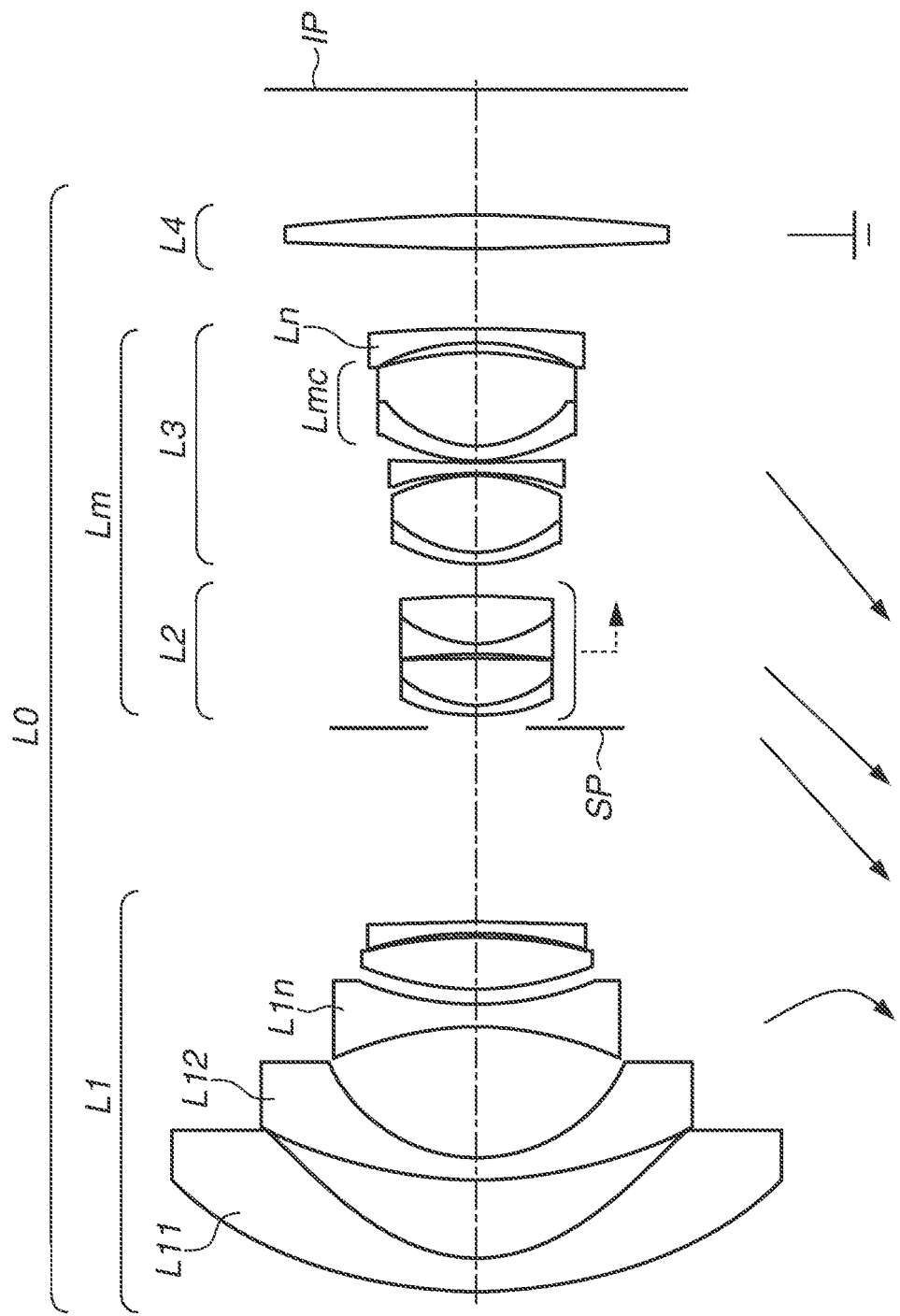
FIG. 7 is a cross-sectional view illustrating lenses of a zoom lens at a wide angle end according to a fourth exemplary embodiment.
Figure 8A:
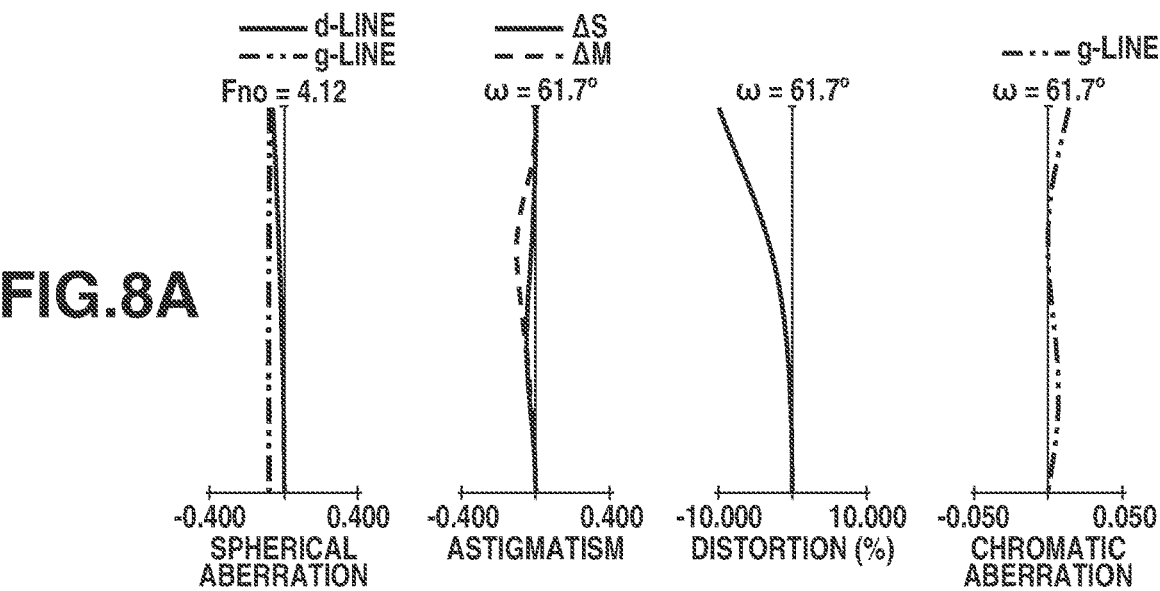
FIGS. 8A to 8C are aberration charts of the zoom lens according to the fourth exemplary embodiment.
Figure 8B:
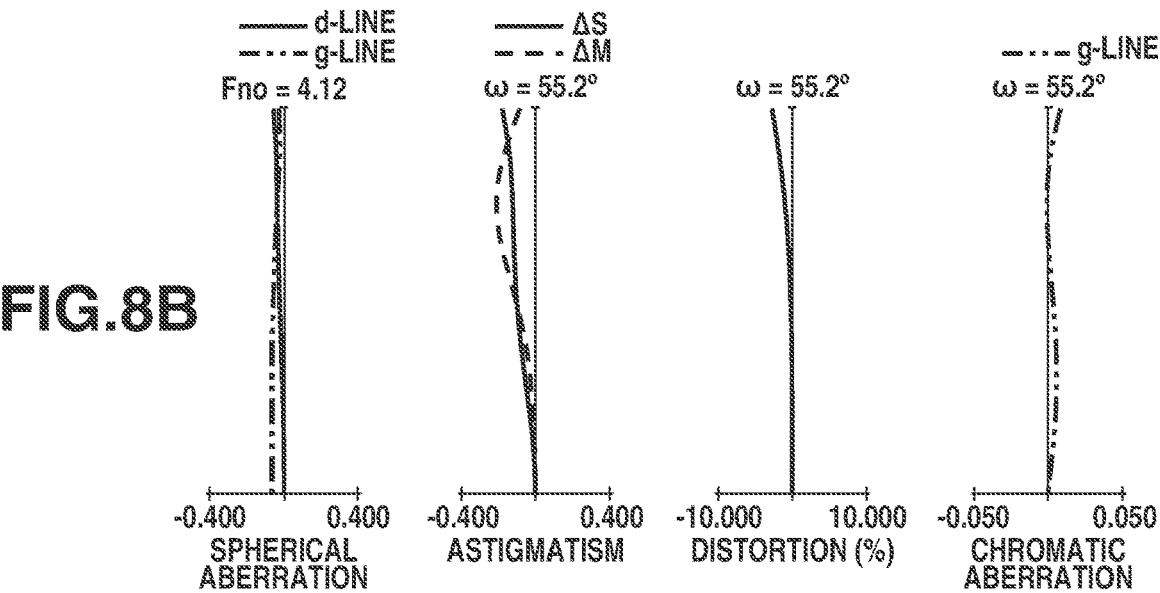
Figure 8C:
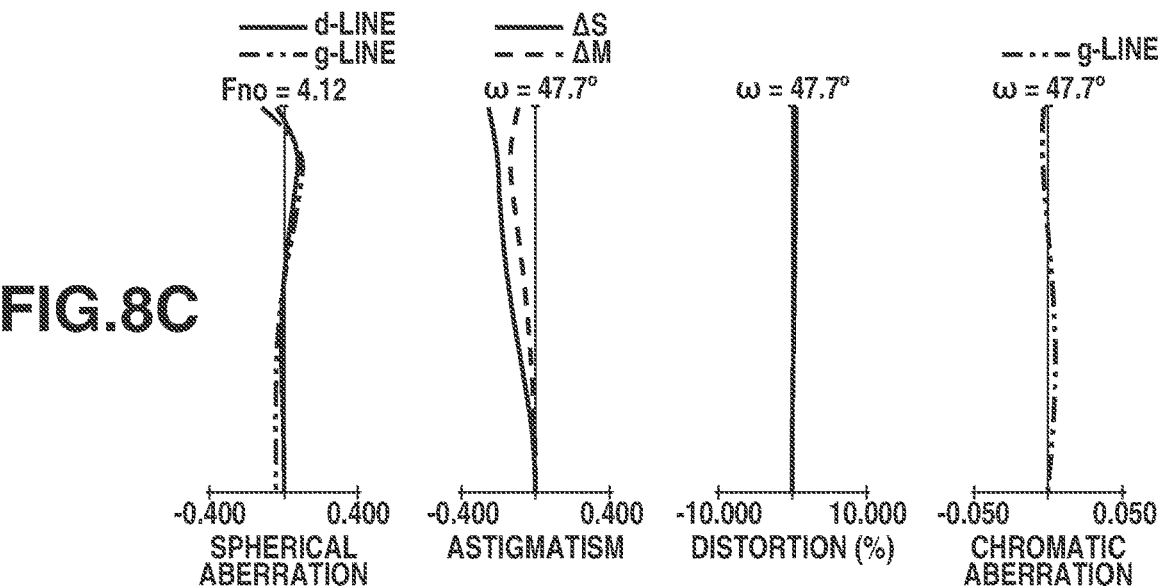

Zoom lenses according to exemplary embodiments of the disclosure and an imaging apparatus including any of the zoom lenses will be described below with reference to the attached drawings.

FIGS. 1, 3, 5, and 7 are cross-sectional views illustrating zoom lenses L0 at a wide angle end according to first to four exemplary embodiments, respectively. Each of the zoom lenses L0 according to the first to fourth exemplary embodiments is an imaging lens system for use in an imaging apparatus such as a video camera, a digital camera, a television (TV) camera, a monitoring camera, or a silver-halide film camera. In each of the cross-sectional views of the zoom lenses L0, the left side is a subject side (an object side or a front side), whereas the right side is an image side (a rear side).

Each of the zoom lenses L0 according to the first to fourth exemplary embodiments consists of a first lens unit L1 having negative refractive power, a middle group Lm including one or more lens units, and a last lens unit having positive refractive power. The term "lens unit" as used herein refers to the unit of movement in zooming (the elements of the zoom lens L0 that move or rest together in zooming). In other words, a spacing between the adjacent lens units changes in zooming. Each of the lens units includes one or more lenses. Each of the lens units may include an aperture stop.

In each of the zoom lenses L0 according to the first and fourth exemplary embodiments, the middle group Lm consists of a second lens unit L2 having positive refractive power and a third lens unit L3 having positive refractive power. Furthermore, the last lens unit is a fourth lens unit L4 having positive refractive power.

In the zoom lens L0 according to the second exemplary embodiment, the middle group Lm consists of the second lens unit L2 having positive refractive power, the third lens unit L3 having positive refractive power, and the fourth lens unit L4 having negative refractive power. Furthermore, the last lens unit is a fifth lens unit L5 having positive refractive power.

In the zoom lens L0 according to the third exemplary embodiment, the middle group Lm consists of the second lens unit L2 having positive refractive power. Furthermore, the last lens unit is the third lens unit L3 having positive refractive power.

In each of the cross-sectional views of the zoom lenses L0, the zoom lens L0 includes an aperture stop SP. In the first to fourth exemplary embodiments, the aperture stop SP is disposed between the first lens unit L1 and the second lens unit L2.

In each of the cross-sectional views, an image plane IP is illustrated. In a case where the zoom lens L0 according to any of the exemplary embodiments is to be used for a digital video camera or a digital still camera, an imaging plane of a solid-state image sensor (a photoelectric conversion device) such as a charge-coupled device (CCD) sensor or a complementary metal oxide semiconductor (CMOS) sensor is disposed at the image plane IP. In a case where the zoom lens L0 according to any of the exemplary embodiments is to be used as an imaging zoom lens of a silver-halide film camera, a photosensitive film surface is disposed at the image plane IP.

In each of the cross-sectional views, a locus in zooming and a locus in focusing are also illustrated.

More specifically, in the first to fourth exemplary embodiments, the first lens unit L1 moves toward the image side so as to draw a convex locus (a locus that moves toward the image side and then moves toward the object side) in zooming from the wide angle end to a telephoto end. With this movement, field curvature at an intermediate zoom region is appropriately corrected while a sufficient zoom ratio is ensured, but any other locus can be employed. The second lens unit L2 moves toward the object side in zooming.

In the first, second, and fourth exemplary embodiments, the third lens unit L3 moves toward the object side in zooming from the wide angle end to the telephoto end. In the third exemplary embodiment, the third lens unit L3 is fixed with respect to the image plane IP in zooming.

In the second exemplary embodiment, the fourth lens unit L4 moves toward the object side in zooming from the wide angle end to the telephoto end.

In the first and fourth exemplary embodiments, the fourth lens unit L4 is fixed with respect to the image plane IP in zooming.

In the second exemplary embodiment, the fifth lens unit L5 is fixed with respect to the image plane IP in zooming.

In the first to fourth exemplary embodiments, focusing from an object at infinity to an object at short distance is performed by moving the second lens unit L2 entirely or partially toward the image side as indicated by a dotted arrow. In focusing, a plurality of lens units may be moved through different loci from each other.

FIGS. 2A to 2C, 4A to 4C, 6A to 6C, and 8A to 8C are aberration charts of the zoom lenses L0 according to the first to fourth exemplary embodiments in a state of focusing on an object at infinity, respectively. The aberration charts of FIGS. 2A, 4A, 6A, and 8A correspond to the wide angle end.

The aberration charts of FIGS. 2B, 4B, 6B, and 8B correspond to an intermediate zoom position. The aberration charts of FIGS. 2C, 4C, 6C, and 8C correspond to the telephoto end.

In each spherical aberration chart, an F-number Fno is specified. In each spherical aberration chart, a spherical aberration amount with respect to a d-line (with a wavelength of 587.6 nm) is indicated by a solid line, and a spherical aberration amount with respect to a g-line (with a wavelength of 435.8 nm) is indicated by a two-dotted dashed line. In each astigmatism chart, an astigmatism amount $\Delta S$ at a sagittal image plane is indicated by a solid line, and an astigmatism amount $\Delta M$ at a meridional image plane is indicated by a broken line. In each distortion aberration chart, a distortion aberration amount with respect to the d-line is indicated. In each chromatic aberration chart, a chromatic aberration amount with respect to the g-line is indicated. A half-angle of view $\omega$ (°) is also specified.

Next, characteristic configurations and conditions of the zoom lenses L0 according to the first to fourth exemplary embodiments will be described.

In each of the zoom lenses L0 according to the first to fourth exemplary embodiments, the first lens unit L1 includes three negative lenses (a first negative lens, a second negative lens, a third negative lens) arranged sequentially in this order from the object side to the image side. With at least three negative lenses arranged sequentially, the refractive power of each of the negative lenses is appropriately distributed, so that coma aberration, field curvature, and distortion aberration at the wide angle end are appropriately corrected.

In each of the zoom lenses L0 according to the first to fourth exemplary embodiments, the number of negative lenses included in the first lens unit L1 is four or less. This prevents an excessive increase in size of the first lens unit L1.

The middle group Lm includes a plurality of cemented lenses each having a cemented surface that is convex toward the object side. The inclusion of the plurality of cemented lenses in the middle group Lm enables appropriate correction of axial chromatic aberration and magnification chromatic aberration in a wide zoom range. Especially, the inclusion of the cemented lenses each having the cemented surface that is convex toward the object side enables appropriate correction of magnification chromatic aberration at the wide angle end.

The middle group Lm also includes a lens element Ln having negative refractive power and disposed closest to the image side among lens elements having negative refractive power included in the middle group Lm. The term "lens element" as used herein refers to a single lens disposed with both of the surfaces in contact with air, or a cemented lens including a plurality of lenses cemented together.

Each of the zoom lenses L0 according to the first to fourth exemplary embodiments is configured to satisfy the following inequalities (1) to (3).

$$1.2 < |f1|/fw < 2.0 \quad (1)$$

$$0.5 < L1s/Lsn < 1.8 \quad (2)$$

$$0.7 < |fn|/Lsn < 2.0 \quad (3)$$

In the inequalities (1) to (3), f1 is a focal length of the first lens unit L1, fw is a focal length of the zoom lens L0 at the wide angle end, L1s is a distance on an optical axis from a lens surface, of the zoom lens L0, disposed closest to the object side to the aperture stop SP at the wide angle end, Lsn is a distance on the optical axis from the aperture stop SP to a lens surface, of the lens element Ln, disposed closest to the image side at the wide angle end, and fn is a focal length of the lens element Ln.

The inequality (1) defines a ratio between the focal length of the first lens unit L1 and the focal length of the zoom lens L0 at the wide angle end in order to achieve a wide angle of view while appropriately correcting off-axis aberration such as magnification chromatic aberration at the wide angle end.

In a case where the absolute value of the focal length of the first lens unit L1 increases and an upper limit value of the inequality (1) is exceeded, it is difficult to achieve a wide angle of view while achieving a size reduction of the zoom lens L0.

In a case where the absolute value of the focal length of the first lens unit L1 decreases and a lower limit value of the inequality (1) is not met, it is difficult to correct off-axis aberration such as magnification chromatic aberration at the wide angle end.

The inequality (2) defines a condition for achieving both the correction of off-axis aberration at the wide angle end and the size reduction of the zoom lens L0.

In a case where the distance from the lens surface of the first lens unit L1 disposed closest to the object side to the aperture stop SP increases and an upper limit value of the inequality (2) is exceeded, a diameter of the first lens unit L1 is upsized to ensure a sufficient amount of ambient light at the wide angle end.

In a case where the distance from the aperture stop SP to the lens surface of the lens element Ln disposed closest to the image side decreases and the upper limit value of the inequality (2) is exceeded, on-axis light and off-axis light that pass through the lens element Ln are insufficiently separated at the wide angle end. In this case, it is difficult to sufficiently correct off-axis aberration at the lens element Ln.

In a case where the distance from the aperture stop SP to the lens surface of the lens element Ln disposed closest to the image side increases and a lower limit value of the inequality (2) is not met, a size of the lens element Ln is upsized to ensure a sufficient amount of ambient light at the wide angle end.

The inequality (3) defines a ratio between the focal length of the lens element Ln and the distance from the aperture stop SP to the lens surface of the lens element Ln disposed closest to the image side in order to achieve both the correction of off-axis aberration at the wide angle end and the size reduction of the entire optical system.

In a case where the absolute value of the focal length of the lens element Ln increases and an upper limit value of the inequality (3) is exceeded, or the absolute value of the focal length of the lens element Ln decreases and a lower limit value of the inequality (3) is not met, off-axis aberration is corrected insufficiently at the wide angle end.

The above-described configuration provides the zoom lens L0 having high optical performance in a wide zoom range while achieving a compact size and a wide angle of view.

In one embodiment, at least one of the upper and lower limit values of the numerical range of each of the inequalities (1) to (3) is set as specified by the following inequalities (1a) to (3a), or is set as specified by the following inequalities (1b) to (3b).

$$1.3 < |f1|/fw < 1.8 \tag{1a}$$

$$0.8 < L1s/Lsn < 1.6 \tag{2a}$$

$$0.8 < |fn|/Lsn < 1.7 \tag{3a}$$

$$1.4 < |f1|/fw < 1.6 \tag{1b}$$

$$1.2 < L1s/Lsn < 1.5 \tag{2b}$$

$$0.9 < |fn|/Lsn < 1.4 \tag{3b}$$

Next, conditions that each of the zoom lenses L0 according to the exemplary embodiments satisfies will be described. Each of the zoom lenses L0 according to the exemplary embodiments satisfies at least one of the following inequalities (4) to (10).

$$2.0 < fmw/fw < 3.6 \tag{4}$$

$$0.70 < f11/f12 < 2.00 \tag{5}$$

$$1.0 < |fn|/skn < 3.0 \tag{6}$$

$$1.0 < fL/|fn| < 5.0 \tag{7}$$

$$70.0 < vd1n < 100.0 \tag{8}$$

$$1.5 < f1n/f1 < 3.0 \tag{9}$$

$$35.0 < vdmp - vdmn < 70.0 \tag{10}$$

In the inequalities (4) to (10), fmw is a focal length of the middle group Lm at the wide angle end, f11 is a focal length of a negative lens L11 disposed closest to the object side in the first lens unit L1, f12 is a focal length of a negative lens L12 disposed adjacent to an image side of the negative lens L11, skn is a distance on the optical axis from the lens surface, of the lens element Ln, disposed closest to the image side to the image plane IP, fL is a focal length of the last lens unit, vd1n and f1n are respectively an Abbe number and a focal length of a negative lens L1n having the greatest Abbe number with respect to the d-line among the negative lenses included in the first lens unit L1, vdmn is an Abbe number, with respect to the d-line, of a negative lens of a cemented lens Lmc disposed closest to the image side among the cemented lenses included in the middle group Lm and each having the cemented surface that is convex toward the object side, and vdmp is an Abbe number, with respect to the d-line, of a positive lens of the cemented lens Lmc.

The inequality (4) defines a condition for appropriately correcting aberrations over a wide zoom range while achieving the size reduction of the zoom lens L0.

In a case where the focal length of the middle group Lm increases and an upper limit value of the inequality (4) is exceeded, the or each lens unit of the middle group Lm moves by a greater amount in zooming from the wide angle end to the telephoto end, and this makes it difficult to sufficiently reduce the entire size of the zoom lens L0.

In a case where the focal length of the middle group Lm decreases and a lower limit value of the inequality (4) is not met, it is difficult to sufficiently reduce variations in aberrations that occur in zooming.

The inequality (5) defines a ratio between the focal lengths of the negative lenses L11 and L12 in order to achieve both the size reduction of the first lens unit L1 and the correction of off-axis aberration at the wide angle end.

In a case where the focal length of the negative lens L11 increases and an upper limit value of the inequality (5) is exceeded, an outer diameter of the negative lens L11 increases, and this makes it difficult to achieve a sufficient size reduction.

In a case where the focal length of the negative lens L11 decreases and a lower limit value of the inequality (5) is not met, it is difficult to sufficiently correct off-axis aberration at the wide angle end.

The inequality (6) defines a ratio between the focal length of the lens element Ln and the distance from the lens surface of the lens element Ln disposed closest to the image side to the image plane IP in order to appropriately correct off-axis aberration while ensuring telecentricity on the image side at the wide angle end.

In a case where the absolute value of the focal length of the lens element Ln increases and an upper limit value of the inequality (6) is exceeded, it is difficult to sufficiently correct off-axis aberration at the wide angle end.

In a case where the focal length of the lens element Ln decreases and a lower limit value of the inequality (6) is not met, it is difficult to ensure sufficient telecentricity on the image side at the wide angle end.

The inequality (7) defines a ratio between the focal length of the last lens unit and the focal length of the lens element Ln in order to appropriately correct off-axis aberration while ensuring telecentricity on the image side at the wide angle end.

In a case where the focal length of the last lens unit increases and an upper limit value of the inequality (7) is exceeded, it is difficult to ensure sufficient telecentricity on the image side at the wide angle end.

In a case where the focal length of the last lens unit decreases and a lower limit value of the inequality (7) is not met, it is difficult to satisfactorily correct off-axis aberration at the wide angle end.

The inequality (8) defines a range of the Abbe number of a negative lens included in the first lens unit L1 in order to appropriately correct axial chromatic aberration and magnification chromatic aberration at the wide angle end.

The inclusion of at least one negative lens satisfying the inequality (8) in the first lens unit L1 makes it possible to correct axial chromatic aberration and magnification chromatic aberration at the wide angle end more appropriately. In a case where an upper or lower limit value of the inequality (8) is exceeded (not met), axial chromatic aberration and magnification chromatic aberration are often corrected excessively or insufficiently.

The inequality (9) defines a ratio between the focal length of the negative lens L1n and the focal length of the first lens unit L1 in order to appropriately correct axial chromatic aberration and magnification chromatic aberration at the wide angle end while appropriately correcting the other off-axis aberrations.

In a case where the focal length of the negative lens L1n increases and an upper limit value of the inequality (9) is exceeded, it is difficult to sufficiently correct axial chromatic aberration and magnification chromatic aberration at the wide angle end.

In a case where the focal length of the negative lens L1n decreases and a lower limit value of the inequality (9) is not met, it is difficult to correct off-axis aberration such as coma aberration or field curvature at the wide angle end.

The inequality (10) defines a difference between the Abbe numbers of the negative and positive lenses of the cemented lens Lmc in order to appropriately correct magnification chromatic aberration at the wide angle end.

Configuring the cemented lens Lmc to satisfy the inequality (10) makes it possible to correct magnification chromatic aberration at the wide angle end more appropriately. In a case where an upper or lower limit value of the inequality (10) is exceeded (not met), magnification chromatic aberration at the wide angle end is often corrected excessively or insufficiently.

In one embodiment, at least one of the upper and lower limit values of each of the inequalities (4) to (10) is a value defined by the following inequalities (4a) to (10a).

$$2.2 < fmw/fw < 3.4 \tag{4a}$$

$$0.75 < f11/f12 < 1.95 \tag{5a}$$

$$1.3 < |fn|/skn < 2.8 \tag{6a}$$

$$1.3 < fL/|fn| < 4.0 \tag{7a}$$

$$75.0 < vd1n < 98.0 \tag{8a}$$

$$1.7 < f1n/f1 < 2.7 \tag{9a}$$

$$40.0 < vdmp - vdmn < 65.0 \tag{10a}$$

Further, in another embodiment, at least one of the upper and lower limit values of each of the inequalities (4) to (10) is a value defined by the following inequalities (4b) to (10b).

$$2.4 < fmw/fw < 3.2 \tag{4b}$$

$$0.80 < f11/f12 < 1.90 \tag{5b}$$

$$1.5 < |fn|/skn < 2.7 \tag{6b}$$

$$1.7 < fL/|fn| < 3.5 \tag{7b}$$

$$80.0 < vd1n < 96.0 \tag{8b}$$

$$1.9 < f1n/f1 < 2.5 \tag{9b}$$

$$45.0 < vdmp - vdmn < 60.0 \tag{10b}$$

Next, a configuration of each of the zoom lenses L0 according to the exemplary embodiments will be described in more detail. The zoom lens L0 may not necessarily have a configuration described below in implementing an exemplary embodiment of the disclosure.

In the first to third exemplary embodiments, the first lens unit L1 consists of a first lens having negative refractive power, a second lens having negative refractive power, a third lens having negative refractive power, a fourth lens having negative refractive power, and a fifth lens having positive refractive power that are arranged in this order from the object side to the image side. In the fourth exemplary embodiment, the first lens unit L1 consists of a first lens having negative refractive power, a second lens having negative refractive power, a third lens having negative refractive power, a fourth lens having positive refractive power, and a fifth lens having negative refractive power that are arranged in this order from the object side to the image side.

In the first exemplary embodiment, the second lens unit L2 of the middle group Lm consists of a first cemented lens with a negative lens and a positive lens cemented together, and a second cemented lens with a negative lens and a positive lens cemented together, and the first and second cemented lenses are arranged in this order from the object side to the image side. Furthermore, the third lens unit L3 of the middle group Lm consists of a third cemented lens with a negative lens and a positive lens cemented together, a fourth cemented lens with a positive lens, a negative lens, a negative lens, and a positive lens cemented together, and a negative lens, and the third cemented lens, the fourth cemented lens, and the negative lens are arranged in this order from the object side to the image side.

In the second exemplary embodiment, the second lens unit L2 of the middle group Lm consists of a first cemented lens with a negative lens and a positive lens cemented together, and a second cemented lens with a negative lens and a positive lens cemented together, and the first and second cemented lens are arranged in this order from the object side to the image side. Furthermore, the third lens unit L3 of the middle group Lm consists of a third cemented lens with a negative lens and a positive lens cemented together, and a fourth cemented lens with a negative lens, a negative lens, and a positive lens cemented together, and the third and fourth cemented lens are arranged in this order from the object side to the image side. Furthermore, the fourth lens unit L4 of the middle group Lm consists of a fifth cemented lens with a negative lens and a positive lens cemented together.

In the third exemplary embodiment, the middle group Lm consists of a first cemented lens with a negative lens and a positive lens cemented together, a second cemented lens with a negative lens and a positive lens cemented together, a third cemented lens with a negative lens and a positive lens cemented together, a fourth cemented lens with a negative lens, a negative lens, and a positive lens cemented together, and a negative lens.

In the fourth exemplary embodiment, the second lens unit L2 of the middle group Lm consists of a first cemented lens with a negative lens and a positive lens cemented together, and a second cemented lens with a negative lens and a positive lens cemented together, and the first and second cemented lens are arranged in this order from the object side to the image side. Furthermore, the third lens unit L3 of the middle group Lm consists of a third cemented lens with a negative lens and a positive lens cemented together, a fourth cemented lens with a negative lens, a negative lens, and a positive lens cemented together, and a negative lens, and the third cemented lens, the fourth cemented lens, and the negative lens are arranged in this order from the object side to the image side.

In the first to fourth exemplary embodiments, the last lens unit consists of a single positive lens. The above-described configuration makes it easier to ensure telecentricity on the image side in a wide zoom range while achieving a size reduction.

Next, first to fourth numerical examples respectively corresponding to the first to fourth exemplary embodiments will be described.

In each of the numerical examples, each surface of the zoom lens L0 is given a surface number i (i is a natural number) in order from the object side. Furthermore, a curvature radius r (mm) of the surface, a lens thickness or a distance (air spacing) d (mm) on the optical axis between the surfaces with the surface numbers i and (i+1), a refractive index nd, with respect to the d-line, of a material of an optical member including the surface, and an Abbe number vd, with respect to the d-line, of the material of the optical member including the surface are specified.

The Abbe number vd is a value defined by the relation vd=(Nd−1)/(NF−NC), where NF, Nd, and NC are refractive indexes of the material with respect to an F-line (with a wavelength of 486.1 nm), the d-line (with a wavelength of 587.6 nm), and a C-line (with a wavelength of 656.3 nm), respectively.

In surface data, an aspheric surface is indicated with an asterisk (*). An aspheric shape is defined by the following formula.

$$x=(h^2/R)/[1+[1-(1+k)(h/R)^2]^{1/2}]+A4h^4+A6h^6+A8h^8+A10h^{10},$$

where k is an eccentricity, A4, A6, A8, A10 . . . are aspheric coefficients, x is a displacement (from a surface vertex as a reference) in an optical axis direction at a height h from the optical axis, and R is a paraxial curvature radius.

Furthermore, a total lens length is a length obtained by adding a back focus to the distance on the optical axis from the frontmost surface of the zoom lens L0 (i.e., the lens surface disposed closest to the object side) to the last surface of the zoom lens L0 (i.e., the lens surface disposed closest to the image side). The back focus is the distance from the last surface of the zoom lens L0 to the image plane IP (the paraxial image plane).

First Numerical Example

| Unit: mm | | | | |
|---|---|---|---|---|
| Surface Data | | | | |
| Surface Number | r | d | nd | vd |
| 1* | 56.099 | 3.50 | 1.77250 | 49.6 |
| 2 | 24.246 | 8.52 | | |
| 3 | 34.584 | 2.30 | 1.95375 | 32.3 |
| 4 | 17.382 | 8.52 | | |
| 5* | 200.682 | 2.30 | 1.58313 | 59.4 |
| 6* | 20.705 | 10.73 | | |
| 7 | −101.447 | 1.20 | 1.49700 | 81.5 |
| 8 | 18.222 | 4.62 | 1.73800 | 32.3 |
| 9 | 478.584 | (variable) | | |
| 10 (aperture) | ∞ | (variable) | | |
| 11 | 23.744 | 1.00 | 1.92286 | 18.9 |
| 12 | 10.960 | 6.27 | 1.79952 | 42.2 |
| 13 | 673.725 | 0.84 | | |
| 14 | −42.651 | 1.00 | 1.90043 | 37.4 |
| 15 | 13.238 | 5.04 | 1.89286 | 20.4 |
| 16 | −61.427 | (variable) | | |
| 17 | 25.139 | 1.20 | 2.00100 | 29.1 |
| 18 | 14.087 | 4.82 | 1.49700 | 81.5 |
| 19 | 19447.656 | 0.15 | | |
| 20 | 22.378 | 6.50 | 1.49700 | 81.5 |
| 21 | −22.245 | 0.20 | | |
| 22 | −49.519 | 1.10 | 1.90043 | 37.4 |
| 23 | 46.100 | 0.20 | | |
| 24 | 21.126 | 1.50 | 2.00100 | 29.1 |
| 25 | 13.367 | 7.91 | 1.49700 | 81.5 |
| 26 | −66.503 | 1.40 | | |
| 27 | −27.449 | 1.50 | 1.85400 | 40.4 |
| 28* | −60.322 | (variable) | | |
| 29 | −133.157 | 4.74 | 1.51633 | 64.1 |
| 30 | −40.481 | 15.09 | | |
| Image Plane | ∞ | | | |

| Aspherical Data | | |
|---|---|---|
| 1st Surface | | |
| K = 0.00000e+000 | A4 = 8.54297e−006 | A6 = −8.01798e−009 |
| A8 = 1.13131e−011 | A10 = −8.67813e−015 | A12 = 4.66323e−018 |
| 5th Surface | | |
| K = 0.00000e+000 | A4 = 8.35841e−005 | A6 = −3.26135e−007 |
| A8 = 5.57011e−010 | A10 = 4.18922e−015 | |
| 6th Surface | | |
| K = −1.40479e+000 | A4 = 1.30666e−004 | A6 = −2.26421e−007 |
| A8 = −1.41303e−009 | A10 = 7.47871e−012 | |
| 28th Surface | | |
| K = 0.00000e+000 | A4 = 3.33336e−005 | A6 = 4.06563e−008 |
| A8 = −2.92759e−010 | A10 = 1.68963e−013 | |

-continued

Unit: mm

Various Data

| Zoom Ratio | 1.88 Wide Angle | Intermediate | Telephoto |
|---|---|---|---|
| Focal Length | 10.30 | 14.90 | 19.40 |
| F-number | 4.12 | 4.12 | 4.12 |
| Half-Angle of View (degrees) | 62.03 | 54.38 | 48.12 |
| Image Height | 19.40 | 20.80 | 21.64 |
| Total Lens Length | 129.14 | 128.47 | 132.69 |
| BF | 15.09 | 15.09 | 15.09 |
| d9 | 17.80 | 7.34 | 2.00 |
| d10 | 1.30 | 1.48 | 1.50 |
| d16 | 2.64 | 2.46 | 2.44 |
| d28 | 5.26 | 15.05 | 24.61 |

Zoom Lens Unit Data

| Group | Start Surface | Focal Length |
|---|---|---|
| 1 | 1 | −14.49 |
| 2 | 11 | 49.35 |
| 3 | 17 | 56.81 |
| 4 | 29 | 110.72 |

Single Lens Data

| Lens | Start Surface | Focal Length |
|---|---|---|
| 1 | 1 | −58.06 |
| 2 | 3 | −39.20 |
| 3 | 5 | −39.78 |
| 4 | 7 | −30.98 |
| 5 | 8 | 25.56 |
| 6 | 11 | −22.92 |
| 7 | 12 | 13.88 |
| 8 | 14 | −11.12 |
| 9 | 15 | 12.60 |
| 10 | 17 | −33.85 |
| 11 | 18 | 28.36 |
| 12 | 20 | 23.59 |
| 13 | 22 | −26.37 |
| 14 | 24 | −40.25 |
| 15 | 25 | 23.16 |
| 16 | 27 | −60.25 |
| 17 | 29 | 110.72 |

Second Numerical Example

Unit: mm

Surface Data

| Surface Number | r | d | nd | vd |
|---|---|---|---|---|
| 1* | 41.574 | 3.50 | 1.58313 | 59.4 |
| 2* | 13.158 | 8.70 | | |
| 3 | 62.750 | 2.30 | 1.77250 | 49.6 |
| 4 | 21.374 | 6.69 | | |
| 5* | 137.929 | 2.30 | 1.85400 | 40.4 |
| 6* | 27.160 | 6.58 | | |
| 7 | −33.966 | 1.20 | 1.49700 | 81.5 |
| 8 | 33.106 | 0.20 | | |
| 9 | 27.579 | 6.16 | 1.73800 | 32.3 |
| 10 | −57.136 | (variable) | | |
| 11 (aperture) | ∞ | (variable) | | |
| 12 | 16.161 | 1.00 | 1.92286 | 18.9 |
| 13 | 10.885 | 4.57 | 1.57840 | 62.8 |
| 14 | 165.918 | 1.11 | | |
| 15 | −50.285 | 1.00 | 1.87070 | 40.7 |
| 16 | 12.492 | 4.81 | 1.84666 | 23.9 |
| 17 | −54.788 | (variable) | | |
| 18 | 18.101 | 1.20 | 1.91082 | 35.3 |
| 19 | 12.663 | 7.47 | 1.49700 | 81.5 |
| 20 | −18.043 | 0.20 | | |
| 21 | −22.014 | 1.10 | 1.90043 | 37.4 |
| 22 | −193.865 | 0.20 | | |
| 23 | 19.500 | 1.50 | 1.95375 | 32.3 |
| 24 | 12.666 | 7.22 | 1.49700 | 81.5 |
| 25 | −58.816 | (variable) | | |
| 26* | −77.191 | 1.50 | 1.85400 | 40.4 |
| 27 | 21.824 | 6.54 | 1.49700 | 81.5 |
| 28 | −54.068 | (variable) | | |
| 29 | −248.857 | 3.55 | 1.84666 | 23.8 |
| 30 | −63.598 | 15.37 | | |
| Image Plane | ∞ | | | |

Aspherical Data $1^{st}$ Surface

K = 0.00000e+000  A4 = −8.50776e−006  A6 = 1.14899e−008
A8 = −8.44163e−012  A10 = 3.70796e−015

$2^{nd}$ Surface

K = −1.75103e+000  A4 = 3.67876e−005  A6 = −1.21075e−007
A8 = 2.76245e−011  A10 = 1.64998e−013  A12 = −1.20578e−016

$5^{th}$ Surface

K = 0.00000e+000  A4 = 6.19388e−006  A6 = −8.51252e−008
A8 = 1.61905e−010

$6^{th}$ Surface

K = 2.88261e+000  A4 = 2.27718e−005  A6 = −2.18414e−008
A8 = 2.74384e−011

$26^{th}$ Surface

K = 0.00000e+000  A4 = −4.20828e−005  A6 = 2.55787e−008
A8 = −4.64042e−010  A10 = 6.61699e−012  A12 = 4.68151e−015

Various Data

| Zoom Ratio | 1.88 Wide Angle | Intermediate | Telephoto |
|---|---|---|---|
| Focal Length | 9.27 | 12.80 | 17.46 |
| F-number | 4.12 | 4.12 | 4.12 |
| Half-Angle of View (degrees) | 64.34 | 58.27 | 51.10 |
| Image Height | 19.30 | 20.70 | 21.64 |
| Total Lens Length | 124.52 | 121.90 | 125.00 |
| BF | 15.37 | 15.37 | 15.37 |
| d10 | 19.78 | 9.25 | 2.00 |
| d11 | 1.35 | 1.41 | 1.40 |
| d17 | 2.66 | 2.73 | 2.71 |
| d25 | 1.62 | 1.86 | 2.00 |
| d28 | 3.13 | 10.67 | 20.92 |

Zoom Lens Unit Data

| Group | Start Surface | Focal Length |
|---|---|---|
| 1 | 1 | −14.47 |
| 2 | 12 | 50.84 |
| 3 | 18 | 33.54 |
| 4 | 26 | −58.19 |
| 5 | 29 | 100.02 |

Single Lens Data

| Lens | Start Surface | Focal Length |
|---|---|---|
| 1 | 1 | −34.58 |
| 2 | 3 | −43.00 |
| 3 | 5 | −39.98 |
| 4 | 7 | −33.53 |
| 5 | 9 | 26.01 |
| 6 | 12 | −39.74 |
| 7 | 13 | 19.92 |

-continued

Unit: mm

| | | |
|---|---|---|
| 8 | 15 | −11.41 |
| 9 | 16 | 12.42 |
| 10 | 18 | −51.72 |
| 11 | 19 | 16.29 |
| 12 | 21 | −27.66 |
| 13 | 23 | −42.45 |
| 14 | 24 | 21.70 |
| 15 | 26 | −19.78 |
| 16 | 27 | 32.21 |
| 17 | 29 | 100.02 |

Third Numerical Example

Unit: mm

Surface Data

| Surface Number | r | d | nd | vd |
|---|---|---|---|---|
| 1 | 34.400 | 3.50 | 1.58313 | 59.4 |
| 2* | 16.622 | 10.11 | | |
| 3 | 40.381 | 2.30 | 2.00100 | 29.1 |
| 4 | 17.403 | 8.13 | | |
| 5* | 90.700 | 2.30 | 1.58313 | 59.4 |
| 6* | 27.050 | 6.71 | | |
| 7 | −33.600 | 1.20 | 1.49700 | 81.5 |
| 8 | 35.822 | 0.20 | | |
| 9 | 30.640 | 5.08 | 1.78096 | 31.2 |
| 10 | −75.913 | (variable) | | |
| 11 (aperture) | ∞ | 1.40 | | |
| 12 | 24.524 | 1.00 | 1.92286 | 18.9 |
| 13 | 12.510 | 4.95 | 1.82301 | 44.0 |
| 14 | 180.357 | 2.32 | | |
| 15 | −59.078 | 1.00 | 1.87070 | 40.7 |
| 16 | 13.098 | 5.42 | 1.80810 | 22.8 |
| 17 | −68.419 | 3.22 | | |
| 18 | 19.012 | 1.20 | 2.00100 | 29.1 |
| 19 | 16.008 | 6.10 | 1.49700 | 81.5 |
| 20 | −25.440 | 0.20 | | |
| 21 | −36.496 | 1.10 | 1.90043 | 37.4 |
| 22 | 103.580 | 0.20 | | |
| 23 | 18.461 | 1.50 | 2.05090 | 26.9 |
| 24 | 11.671 | 10.18 | 1.49700 | 81.5 |
| 25 | −29.723 | 0.91 | | |
| 26 | −24.961 | 1.50 | 1.85400 | 40.4 |
| 27* | −72.116 | (variable) | | |
| 28 | −264.561 | 4.01 | 1.48749 | 70.2 |
| 29 | −55.806 | 16.34 | | |
| Image Plane | ∞ | | | |

Aspherical Data $2^{nd}$ Surface

K = −5.53262e−001  A4 = −4.77532e−007  A6 = −1.10588e−008
A8 = 1.83751e−011  A10 = −1.16497e−013

$5^{th}$ Surface

K = 0.00000e+000  A4 = 8.88984e−006  A6 = 7.13658e−009
A8 = −3.04399e−011

$6^{th}$ Surface

K = 1.23047e+000  A4 = 1.72971e−005  A6 = 1.91288e−008
A8 = 1.94281e−010

$27^{th}$ Surface

K = 0.00000e+000  A4 = 2.82781e−005  A6 = 2.15940e−008
A8 = −4.36051e−010  A10 = 1.38022e−012  A12 = −1.58613e−014

-continued

Unit: mm

Various Data

| Zoom Ratio | | 2.05 | |
|---|---|---|---|
| | Wide Angle | Intermediate | Telephoto |
| Focal Length | 11.33 | 16.19 | 23.28 |
| F-number | 4.12 | 4.12 | 4.12 |
| Half-Angle of View (degrees) | 59.58 | 52.36 | 42.90 |
| Image Height | 19.30 | 21.00 | 21.64 |
| Total Lens Length | 130.00 | 127.14 | 131.90 |
| BF | 16.34 | 16.34 | 16.34 |
| d10 | 22.38 | 10.46 | 2.00 |
| d27 | 5.54 | 14.61 | 27.83 |

Zoom Lens Unit Data

| Group | Start Surface | Focal Length |
|---|---|---|
| 1 | 1 | −17.42 |
| 2 | 12 | 28.97 |
| 3 | 28 | 144.17 |

Single Lens Data

| Lens | Start Surface | Focal Length |
|---|---|---|
| 1 | 1 | −59.47 |
| 2 | 3 | −32.17 |
| 3 | 5 | −66.99 |
| 4 | 7 | −34.69 |
| 5 | 9 | 28.55 |
| 6 | 12 | −28.82 |
| 7 | 13 | 16.12 |
| 8 | 15 | −12.23 |
| 9 | 16 | 14.02 |
| 10 | 18 | −126.51 |
| 11 | 19 | 20.79 |
| 12 | 21 | −29.86 |
| 13 | 23 | −34.05 |
| 14 | 24 | 18.36 |
| 15 | 26 | −45.37 |
| 16 | 28 | 144.17 |

Fourth Numerical Example

Unit: mm

Surface Data

| Surface Number | r | d | nd | vd |
|---|---|---|---|---|
| 1* | 56.725 | 3.50 | 1.58313 | 59.4 |
| 2* | 16.247 | 8.00 | | |
| 3 | 47.182 | 2.30 | 1.85150 | 40.8 |
| 4 | 16.606 | 13.49 | | |
| 5* | −27.537 | 2.30 | 1.43875 | 94.7 |
| 6* | 48.093 | 1.58 | | |
| 7 | 31.644 | 5.30 | 1.73800 | 32.3 |
| 8 | −46.000 | 0.40 | | |
| 9 | −38.000 | 1.20 | 1.80400 | 46.5 |
| 10 | −176.688 | (variable) | | |
| 11 (aperture) | ∞ | (variable) | | |
| 12 | 20.075 | 1.00 | 1.92286 | 18.9 |
| 13 | 11.750 | 4.80 | 1.66672 | 48.3 |
| 14 | −366.339 | 0.52 | | |
| 15 | −54.856 | 1.00 | 1.87070 | 40.7 |
| 16 | 12.212 | 4.92 | 1.84666 | 23.9 |
| 17 | −93.053 | (variable) | | |
| 18 | 16.685 | 1.20 | 1.91082 | 35.3 |
| 19 | 12.147 | 7.91 | 1.49700 | 81.5 |
| 20 | −19.012 | 0.20 | | |
| 21 | −28.442 | 1.10 | 1.90043 | 37.4 |

-continued

Unit: mm

| | | | | |
|---|---|---|---|---|
| 22 | 174.067 | 0.20 | | |
| 23 | 18.819 | 1.50 | 1.95375 | 32.3 |
| 24 | 11.822 | 9.62 | 1.49700 | 81.5 |
| 25 | −29.854 | 1.00 | | |
| 26 | −20.390 | 1.50 | 1.85400 | 40.4 |
| 27* | −55.000 | (variable) | | |
| 28 | 277.215 | 3.50 | 1.84666 | 23.9 |
| 29 | −157.100 | 13.00 | | |
| Image Plane | ∞ | | | |

Aspherical Data

1st Surface

K = 0.00000e+000   A4 = 2.73444e−006   A6 = −2.04458e−010
A8 = −1.10710e−012  A10 = 8.13351e−016

2nd Surface

K = −1.08469e+000   A4 = 5.05865e−006   A6 = −4.69295e−009
A8 = 1.90605e−013   A10 = −1.15249e−013   A12 = 1.09903e−016

5th Surface

K = 1.07137e+000   A4 = 5.95540e−005   A6 = −1.59697e−007
A8 = 1.46894e−010

6th Surface

K = 3.15076e+000   A4 = 6.00822e−005   A6 = −1.25125e−007
A8 = −9.05637e−010   A10 = 3.54713e−012

27th Surface

K = 0.00000e+000   A4 = 3.81421e−005   A6 = 6.96414e−008
A8 = −6.50446e−010   A10 = 8.82367e−014

Various Data

Zoom Ratio 1.87

| | Wide Angle | Intermediate | Telephoto |
|---|---|---|---|
| Focal Length | 10.50 | 14.59 | 19.69 |
| F-number | 4.12 | 4.12 | 4.12 |
| Half-Angle of View (degrees) | 61.70 | 55.21 | 47.70 |
| Image Height | 19.50 | 21.00 | 21.64 |
| Total Lens Length | 123.70 | 120.84 | 123.60 |
| BF | 13.00 | 13.00 | 13.00 |
| d10 | 19.92 | 9.22 | 2.25 |
| d11 | 1.30 | 1.74 | 1.92 |
| d17 | 3.29 | 2.85 | 2.67 |
| d27 | 8.15 | 15.99 | 25.72 |

Zoom Lens Unit Data

| Group | Start Surface | Focal Length |
|---|---|---|
| 1 | 1 | −16.00 |
| 2 | 12 | 54.80 |
| 3 | 18 | 51.87 |
| 4 | 28 | 118.87 |

Single Lens Data

| Lens | Start Surface | Focal Length |
|---|---|---|
| 1 | 1 | −40.33 |
| 2 | 3 | −31.17 |
| 3 | 5 | −39.54 |
| 4 | 7 | 26.16 |
| 5 | 9 | −60.45 |
| 6 | 12 | −32.58 |
| 7 | 13 | 17.16 |
| 8 | 15 | −11.39 |
| 9 | 16 | 13.03 |
| 10 | 18 | −56.11 |
| 11 | 19 | 16.29 |
| 12 | 21 | −27.08 |
| 13 | 23 | −37.24 |
| 14 | 24 | 18.45 |

-continued

Unit: mm

| | | |
|---|---|---|
| 15 | 26 | −38.71 |
| 16 | 28 | 118.87 |

The following table shows various values according to the exemplary embodiments.

TABLE 1

| | Exemplary Embodiments | | | |
|---|---|---|---|---|
| | 1st | 2nd | 3rd | 4th |
| (1) $1.2 < |f1|/fw < 2.0$ | 1.41 | 1.56 | 1.54 | 1.52 |
| (2) $0.5 < Lls/Lsn < 1.8$ | 1.33 | 1.27 | 1.47 | 1.41 |
| (3) $0.7 < |fn|/Lsn < 2.0$ | 1.35 | 1.29 | 1.07 | 0.94 |
| (4) $2.0 < fmw/fw < 3.6$ | 2.62 | 3.02 | 2.56 | 2.59 |
| (5) $0.70 < f1/f2 < 2.00$ | 1.481 | 0.804 | 1.849 | 1.294 |
| (6) $1.0 < |fn|/skn < 3.0$ | 2.40 | 2.64 | 1.75 | 1.57 |
| (7) $1.0 < fL/|fn| < 5.0$ | 1.84 | 1.72 | 3.18 | 3.07 |
| (8) $70.0 < vdln < 100.0$ | 81.54 | 81.54 | 81.54 | 94.66 |
| (9) $1.5 < fln/fl < 3.0$ | 2.14 | 2.32 | 1.99 | 2.47 |
| (10) $35.0 < vdmp - vdmn < 70.0$ | 52.41 | 49.22 | 54.6 | 49.22 |

Imaging Apparatus

Figure 9:
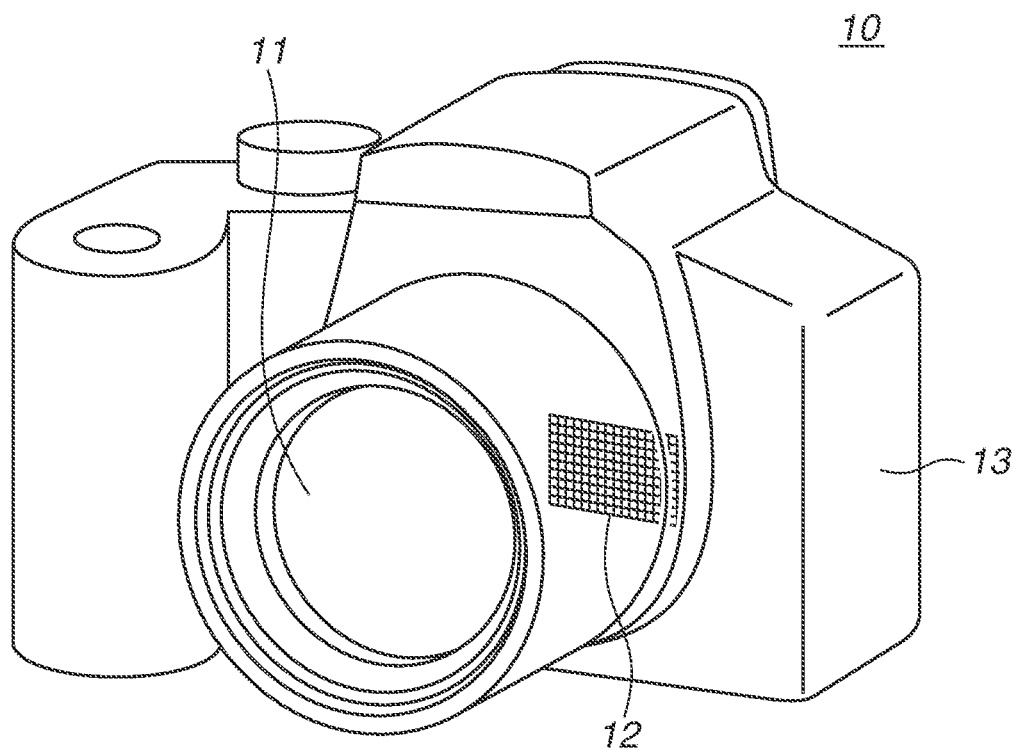
FIG. 9 is a schematic view illustrating an imaging apparatus.

Next, a digital still camera (an imaging apparatus) using the zoom lens L0 according to any of the exemplary embodiments of the disclosure will be described with reference to FIG. 9. In FIG. 9, a camera body 10 and a lens apparatus 11 are illustrated. The lens apparatus 11 includes the zoom lens L0 according to one of the first to fourth exemplary embodiments.

A solid-state image sensor (a photoelectric conversion device) 12, such as a CCD sensor or a CMOS sensor, is built in the camera body 10. The solid-state image sensor 12 receives an optical image formed by the lens apparatus 11 and photoelectrically converts the received optical image. The camera body 10 may be a single-lens reflex camera with a quick return mirror or a mirrorless camera without a quick return mirror.

As described above, application of the zoom lens L0 according to any of the exemplary embodiments of the disclosure to an imaging apparatus such as a digital still camera makes it possible to provide high optical performance in a wide zoom range while achieving a size reduction and a wide angle of view.

While the exemplary embodiments and examples of the disclosure have been described above, the disclosure is not limited to the exemplary embodiments and the examples, and various combinations, modifications, and changes can be made within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108063, filed Jun. 29, 2021, which is hereby incorporated by reference herein in its entirety.

What is claimed is:

1. A zoom lens comprising a first lens unit having negative refractive power, a middle group consisting of a second lens unit having positive refractive power and a third lens unit disposed closer to an image side with respect to the second lens unit and having positive refractive power, and a last lens unit having positive refractive power that are arranged in an order from the object side to an image side,
- wherein a spacing between adjacent lens units, among the lens units, changes in zooming,
- wherein the zoom lens includes an aperture stop,
- wherein the first lens unit includes a first negative lens, a second negative lens, and a third negative lens that are arranged in the order from the object side to the image side,
- wherein a number of the negative lenses included in the first lens unit is three or four,
- wherein the middle group includes a plurality of cemented lenses each having a cemented surface that is convex toward the object side, and includes a lens element Ln that is disposed closest to the image side among lens elements having negative refractive power included in the middle group, and
- wherein the following inequalities are satisfied:

$$1.2 < |f1|/fw < 2.0,$$

$$0.5 < L1s/Lsn < 1.8, \text{ and}$$

$$0.7 < |fn|/Lsn < 2.0,$$

where f1 is a focal length of the first lens unit, fw is a focal length of the zoom lens at a wide angle end, L1s is a distance on an optical axis from a lens surface, of the zoom lens, disposed closest to the object side to the aperture stop at the wide angle end, Lsn is a distance on the optical axis from the aperture stop to a lens surface, of the lens element Ln, disposed closest to the image side at the wide angle end, and fn is a focal length of the lens element Ln.

2. The zoom lens according to claim 1,
- wherein the first lens unit includes, as the first negative lens, a negative lens L11 disposed closest to the object side, and
- wherein the following inequality is satisfied:

$$2.0 < fmw/fw < 3.6,$$

where fmw is a focal length of the middle group at the wide angle end.

3. The zoom lens according to claim 1,
- wherein the first lens unit includes, as the first negative lens, a negative lens L11 disposed closest to the object side and includes, as the second negative lens, a negative lens L12 disposed adjacent to an image side of the negative lens L11, and
- wherein the following inequality is satisfied, $$0.70 < f11/f12 < 2.00,$$

where f11 is a focal length of the negative lens L11, and f12 is a focal length of the negative lens L12.

4. The zoom lens according to claim 1,
- wherein the following inequality is satisfied:

$$1.0 < |fn|/skn < 3.0,$$

where skn is a distance on the optical axis from the lens surface, of the lens element Ln, disposed closest to the image side to an image plane.

5. The zoom lens according to claim 1,
- wherein the following inequality is satisfied:

$$1.0 < fL/|fn| < 5.0,$$

where fL is a focal length of the last lens unit.

6. The zoom lens according to claim 1,
- wherein the following inequality is satisfied:

$$70.0 < vd1n < 100.0,$$

where vd1n is an Abbe number of a negative lens L1n having a greatest Abbe number with respect to a d-line among the negative lenses included in the first lens unit.

7. The zoom lens according to claim 1,
- wherein the following inequality is satisfied:

$$1.5 < f1n/f1 < 3.0,$$

where f1n is a focal length of a negative lens L1n having a greatest Abbe number with respect to a d-line among the negative lenses included in the first lens unit.

8. The zoom lens according to claim 1,
- wherein a cemented lens Lmc including a positive lens and a negative lens is disposed closest to the image side among the plurality of cemented lenses included in the middle group and each having the cemented surface that is convex toward the object side, and
- wherein the following inequality is satisfied:

$$35.0 < vdmp - vdmn < 70.0,$$

where vdmn is an Abbe number, with respect to a d-line, of the negative lens included in the cemented lens Lmc, and vdmp is an Abbe number, with respect to the d-line, of the positive lens included in the cemented lens Lmc.

9. The zoom lens according to claim 1, wherein, in zooming from the wide angle end to a telephoto end, the first lens unit moves toward the image side and then moves toward the object side.

10. An apparatus comprising:
- the zoom lens according to claim 1; and
- a sensor configured to receive an optical image formed by the zoom lens.

11. The apparatus according to claim 10,
- wherein the first lens unit includes, as the first negative lens, a negative lens L11 disposed closest to the object side, and
- wherein the following inequality is satisfied:

$$2.0 < fmw/fw < 3.6,$$

where fmw is a focal length of the middle group at the wide angle end.

12. The apparatus according to claim 10,
- wherein the first lens unit includes, as the first negative lens, a negative lens L11 disposed closest to the object side and includes, as the second negative lens, a negative lens L12 disposed adjacent to an image side of the negative lens L11, and
- wherein the following inequality is satisfied, $$0.70 < f11/f12 < 2.00,$$

where f11 is a focal length of the negative lens L11, and f12 is a focal length of the negative lens L12.

13. The apparatus according to claim 10,
- wherein the following inequality is satisfied:

$$1.0 < |fn|/skn < 3.0,$$

where skn is a distance on the optical axis from the lens surface, of the lens element Ln, disposed closest to the image side to an image plane.

14. The apparatus according to claim 10,
- wherein the following inequality is satisfied:

$$1.0 < fL/|fn| < 5.0,$$

where fL is a focal length of the last lens unit.

15. The apparatus according to claim 10,
- wherein the following inequality is satisfied:

$$70.0 < vd1n < 100.0,$$

where vd1n is an Abbe number of a negative lens L1n having a greatest Abbe number with respect to a d-line among the negative lenses included in the first lens unit.

16. The apparatus according to claim 10, wherein the following inequality is satisfied:

$$1.5 < f1n/f1 < 3.0,$$

where f1n is a focal length of a negative lens L1n having a greatest Abbe number with respect to a d-line among the negative lenses included in the first lens unit.

17. The apparatus according to claim 10,
wherein a cemented lens Lmc including a positive lens and a negative lens is disposed closest to the image side among the plurality of cemented lenses included in the middle group and each having the cemented surface that is convex toward the object side, and
wherein the following inequality is satisfied:

$$35.0 < vdmp - vdmn < 70.0,$$

where vdmn is an Abbe number, with respect to a d-line, of the negative lens included in the cemented lens Lmc, and vdmp is an Abbe number, with respect to the d-line, of the positive lens included in the cemented lens Lmc.

* * * * *